(12) United States Patent
Nelson et al.

(10) Patent No.: US 7,851,415 B2
(45) Date of Patent: Dec. 14, 2010

(54) ADAPTIVE CEMENTITIOUS COMPOSITES FOR WELL COMPLETIONS

(75) Inventors: Erik Nelson, Houston, TX (US); Ernest Brown, Cambridge (GB); Benedicte Zusatz-Ayache, Malabry (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 363 days.

(21) Appl. No.: 11/569,050

(22) PCT Filed: May 13, 2005

(86) PCT No.: PCT/EP2005/005384

§ 371 (c)(1),
(2), (4) Date: Aug. 29, 2007

(87) PCT Pub. No.: WO2005/110942

PCT Pub. Date: Nov. 24, 2005

(65) Prior Publication Data

US 2008/0045421 A1    Feb. 21, 2008

(51) Int. Cl.
*C09K 8/60* (2006.01)
*C23G 1/06* (2006.01)
*E21B 43/04* (2006.01)
*E47B 43/00* (2006.01)
*E21B 43/267* (2006.01)

(52) U.S. Cl. ........................ 507/204; 507/261; 507/266; 166/278; 166/279; 166/280.2

(58) Field of Classification Search .................. 507/204, 507/261, 266; 166/278, 279, 280.2
See application file for complete search history.

(56) References Cited

U.S. PATENT DOCUMENTS

| 3,429,373 A | 2/1969 | Harnsberger |
| 3,646,998 A | 3/1972 | Curtice |
| 3,654,990 A | 4/1972 | Harnsberger |
| 3,654,991 A | 4/1972 | Harnsberger |
| 3,654,992 A | 4/1972 | Harnsberger |
| 3,768,561 A | 10/1973 | Tate |
| 3,849,316 A * | 11/1974 | Motley et al. ............... 507/219 |
| 3,861,467 A | 1/1975 | Harnsberger |
| 3,862,663 A | 1/1975 | Curtice |
| 3,948,672 A | 4/1976 | Harnsberger |
| 4,875,525 A * | 10/1989 | Mana ....................... 166/280.2 |
| 5,339,902 A | 8/1994 | Harris |
| 5,518,996 A | 5/1996 | Maroy |
| 6,192,985 B1 * | 2/2001 | Hinkel et al. ............. 166/280.1 |
| 6,202,751 B1 | 3/2001 | Chatterji |
| 6,213,209 B1 | 4/2001 | Nguyen |
| 6,364,945 B1 | 4/2002 | Chatterji |
| 6,390,195 B1 | 5/2002 | Nguyen |
| 6,592,660 B2 | 7/2003 | Nguyen |
| 2005/0194141 A1 * | 9/2005 | Sinclair et al. ........... 166/280.2 |

FOREIGN PATENT DOCUMENTS

| DE | 4320269 A1 | 12/1994 |
| EP | 0621247 B1 | 7/1999 |
| GB | 2407317 A | 4/2005 |
| RU | 2019689 C1 | 9/1994 |
| WO | 0187797 A1 | 11/2001 |
| WO | 2004101704 A1 | 11/2004 |

* cited by examiner

*Primary Examiner*—Timothy J. Kugel
*Assistant Examiner*—Atnaf Admasu
(74) *Attorney, Agent, or Firm*—Martin Rzaniak; David Cate; Robin Nava

(57) ABSTRACT

An adaptive cementitious composite composition, comprising: a coarse particulate material such as sand or proppant; a series of other particulate or fibrous materials; and a carrier fluid; the sand and other particulate materials being present as a series of coarse, medium and fine particle sizes in ratios selected to provide an optimized packing volume fraction; wherein the sand or proppant is coated with a resin and at least one of the other particulate or fibrous materials is a material that can be modified when placed at a downhole location.

13 Claims, No Drawings

ADAPTIVE CEMENTITIOUS COMPOSITES FOR WELL COMPLETIONS

This invention relates to adaptive cementitious composites, the performance of which can be modified after placement in a downhole environment. The invention is also related to gravel packs and sand packs, the term "gravel pack" being used to cover both.

Gravel packs are a well-known technique for preventing the migration of formation material into a wellbore during the production of fluids from a well. One particular version of a gravel pack is the resin-coated gravel pack. In such a technique, a high-density resin-gravel slurry is prepared in a thickened brine carrier fluid, and pumped down the annulus between the formation and a permeable screen. The resin-gravel slurry enters the into perforation tunnels and fills the annulus between the formation and a permeable screen. After placement the resin is allowed to consolidate. The consolidated gravel pack and the screen provide a permeable structure through which formation fluids (oil, water, gas) can flow while the production of sand into the main wellbore is inhibited. An alternate method is to simply fill the entire well-bore and perforations with the resin-gravel slurry. After the slurry has cured, the excess material is drilled out. A specific example of this technique is the SANDLOCK™ service of Schlumberger.

In recent years, work has been performed to prepare high-permeability cement systems. Such cements could be used in lieu of proppant or gravel packs in various oilfield applications, including sand control, water control and hydraulic fracturing (particularly tip screenouts for screenless completions). Whilst there has been success in preparing highly porous cements by various methods, the permeability obtained has not been sufficiently high to be useful in the above applications. In addition, the cements are not sufficiently resistant to an acid treatment—a common oilfield practice to clean up formation damage.

U.S. Pat. No. 6,202,751, U.S. Pat. No. 6,364,945, U.S. Pat. No. 6,390,195 and U.S. Pat. No. 6,592,660 describe the use of Portland cement slurries containing acid-soluble particulate solids, liquid hydrocarbon-soluble particulate solids or particulate crosslinked gels with an internal breaker. The slurry is placed as a foam. The preferred acid-soluble particulate solid is calcium carbonate. The preferred liquid hydrocarbon-soluble particle is gilsonite (using xylene as the solvent). The preferred crosslinked polymer is hydroxyalklycelluose grafted with vinyl phosphonic acid. The breaker can be hemicellulase or an oxidizer such as ammonium persulfate. An acid/xylene flush is applied to create the permeability in the set matrix.

Other proposals to provide permeable cements for well applications include the use of a mixture of sand, cement and water suspended in a hydrocarbon for injection into the zone to be treated, see for example U.S. Pat. No. 3,429,373, U.S. Pat. No. 3,646,998, U.S. Pat. No. 3,654,990, U.S. Pat. No. 3,654,991, U.S. Pat. No. 3,654,992, U.S. Pat. No. 3,768,561, U.S. Pat. No. 3,861,467, U.S. Pat. No. 3,862,663 and U.S. Pat. No. 3,948,672. Another proposal is the use of a cement incorporating a material that can be removed to leave porosity and permeability, such as by dissolution with acid or decomposition by heat, see for example RU 2019689 and U.S. Pat. No. 6,202,751. A yet further prior proposal is to use foamed cements, often with extreme foam qualities (foam quality is the ratio of the dispersed phase (gas) volume to total volume of foamed composition under given pressure and temperature conditions). Examples of such a proposal can be found in U.S. Pat. No. 5,339,902. WO 0187797 describes a permeable cement composition comprising an aqueous slurry of a hydraulic cement including a water-immiscible dispersed fluid phase, such as oil or gas, and a hollow particulate material, the hollow particulate material being one which breaks down in the presence of the cement so as to leave voids which together with the dispersed phase create a permeable structure in the cement.

Organic matrices such as epoxy resins can be used as an alternative to Portland cement for these applications, as it is well known that epoxy resins are acid resistant. U.S. Pat. No. 6,213,209 describes a method to prepare a pumpable resin composition, which delayedly forms a hardened open cell foam. The resin composition is an epichlorohydrin and bisphenol A condensate epoxy resin containing diluents, a delayed hardening agent, a gas forming filler, a delayed gas generating activator, and a surfactant. The preferred hardening agent is 1,4-diamino cyclohexane. The preferred gas forming filler is sodium bicarbonate. The preferred delayed gas generating activator is citric acid. Citric acid reacts with sodium bicarbonate to form carbon dioxide. It is claimed that this gas causes the resin composition to be converted into open cell foams, which upon hardening allow the passage of well fluids therethrough while screening and preventing the passage or the formation of sand.

The physical properties of these systems, whether cement-based, or gravel packs, depend on the solids content of the fluids pumped downhole to place them in the zones of interest. Cement slurries and other oilfield fluids having good stability and high solids contents are described in EP 0 621 247 (cement) and U.S. Pat. No. 5,518,996 (other fluids).

The invention seeks to provide a gravel pack system that can be placed in a similar manner to cement and that can have predetermined or modifiable properties in its downhole state.

This invention provides a composite cementitious composition, comprising: sand or a particulate proppant; a series of other particulate materials; and a carrier fluid; the sand or proppant and other particulate materials being present as a series of coarse, medium and fine particle sizes in ratios selected to provide an optimized packing volume fraction; wherein the sand or proppant is coated with a resin and at least one of the other particulate materials is a material that can be modified when placed at a downhole location.

In addition to the sand or proppant and particulate materials, fibers may be included to either enhance permeability or provide structural support.

The resulting material, with or without the inclusion of fibers is a cementitious composite whose permeability can be modified by one or more chemical treatments following placement and curing. Such a composite provides improved production selectivity.

Suitable materials for the proppant include sand, ceramic proppant, bauxite proppant, glass beads and ceramic microspheres. 4/6 mesh to 70/140 mesh particles are particularly preferred.

Preferably, the sand or proppant comprises the coarse particle size. The other particulate materials can include (but are not limited to) one or more of calcium carbonate, hydrocarbon soluble polymers, superabsorbent polymers and water-soluble polymers such as polyvinyl alcohol, polyglycolic acid and polylactic acid. Fibers that can be added include (but are not limited to) glass fibers, novoloid resin fibers and water soluble fibers comprised of (but not limited to) polyvinyl alcohol, polyglycolic acid and polylactic acid.

The carrier fluid preferably comprises a thickened brine.

One particular composition according to the invention comprises sand having an average particle size of about 650 microns; and calcium carbonate having an average particle size of about 60 microns and a substantial fraction of particles in the 6 micron particle range and being present in an amount of about 10% by volume of solids in the composition.

A method according to the invention comprises pumping a composition as described above into a region of interest in the well and allowing the resin to cure so as to consolidate the particulate materials.

Following consolidation, the properties of the consolidated composition can be modified using a treatment fluid. The treatment fluid can include formation fluid such as natural hydrocarbon or water, organic fluids pumped from the surface, for example solvents such as xylene, water, steam or acid pumped from the surface.

The placement method typically comprises pumping a spacer fluid and a pad fluid into the region of interest ahead of the composition. A treatment fluid, such as acid, can be pumped into the region interest after the particulate materials have consolidated.

The composition can be prepared by mixing proppant with a carrier fluid and resin, adding the other particulate material and mixing in a breaker fluid.

The invention will now be described in more detail with reference to the following examples.

EXAMPLE A

Prior Art

This example comprises a prior art resin-coated gravel pack system of the type provided by Schlumberger under the SANDLOCK™ service. The system is provided in three separate fluids: a spacer, a pad fluid and a slurry.
a) The spacer fluid is prepared by mixing 100 lb of ammonium chloride with 12 bbl of fresh water (an alternative is 50 lb of potassium chloride in 12 bbl of water).
b) The pad fluid and slurry are prepared from a common base fluid. This is prepared by mixing 50 lb of potassium chloride and 0.25 gal of an antifoam agent with 6 bbl fresh water.
c) 15 lb of a gelling agent are added and the mixture agitated for 3-5 minutes.
d) 5 lb of chelating agent is added to remove cations, particularly Ca and Mg that might interfere with the consolidation process. The mixture is agitated for 10-20 minutes until it thickens to an appropriate viscosity.
e) 3.5 bbl are reserved as pad fluid, the remaining 2.5 bbl is used to prepare the slurry.
f) The slurry is prepared by mixing 1 gal of a non-emulsifying agent to the 2.5 bbl of thickened fluid. The non-emulsifying agent is an oil-wetting surfactant that ensures that the resin adsorbs onto the surface of the sand particles.
g) 1900 lb of sand is mixed into the fluid and agitated. The sand can be any suitable sand for gravel pack applications.
h) 15 gal of a resin solution, 5 gal of a curing agent and, optionally 1 pint-0.5 gal of a catalyst are mixed into the sand slurry.
i) A breaker solution is prepared by mixing 0.5-1 bbl of a low temperature breaker such as erythorbic acid with 1 gal of fresh water. 0.75 gal of the breaker solution is added to the pad fluid reserved in step e), and 0.25 gal of the breaker solution is added to the slurry of step h) a few minutes before they are pumped into the well.
j) The spacer fluid is pumped into the region of interest to displace any existing formation fluids, mud or other contaminants. The pad fluid is them pumped to displace the spacer and any formation brines and saturate any proppant near the wellbore with an oil-wetting surfactant. The resin slurry, containing the same surfactant as the pad fluid, is pumped immediately after the pad and allowed to consolidate.

EXAMPLE B

Invention

This example is based on the prior art system of Example A. The spacer and pad fluids are prepared in the same manner as steps a)-e) above. In the preparation of the slurry, in step g), the sand mixed in is 20/40 Ottawa sand ($d_{50}$=650 micron). Prior to mixing the breaker solution with the slurry in step i), 10% by volume of solids of SAFECARB 40 from MI Drilling Fluids is added. This is a sized calcium carbonate with a $d_{50}$ of 60 microns and a substantial fraction of material in the 6 micron size range. This mixture of sand and calcium carbonate provides particles in three particle size bands that allow optimised packing volume fraction (PVF) to be approached.

Following consolidation of the resin, the gravel pack is acidised to dissolve the calcium carbonate and leave a permeable matrix in the well. Such material can have a compressive strength of about 400 psi and a water permeability of over 100 D.

By optimising the PVF in this manner, the slurry can include a significant quantity of solid material that can be used to adapt the behaviour of the gravel pack. In example B, the use of calcium carbonate allows a highly permeable matrix to be formed after acidisation. However, the particulate materials added to the sand are not restricted to such adaptation. The following are just some of the materials that can be incorporated into the slurry in accordance with the invention:

Calcium carbonate: after acidizing sand pack, the resulting matrix is highly permeable Hydrocarbon soluble polymers: sand pack becomes more permeable across oil rich zones, helps exclude water production.

Superabsorbent polymers: particles swell when in contact with water, shutting off permeability.

Polyvinyl alcohol, polyglycolic acid and polylactic acid: polymers are soluble at elevated temperatures. Matrix can be steamed across areas where production is desired. Untreated matrix will remain impermeable.

Fibres: incorporated into the matrix; soluble fibres can augment connectivity between sand grain interstices; insoluble fibres act as structural reinforcement.

It will be appreciated that changes can be made to the systems described while staying within the scope of the invention. For example, different resins may be used, such as PTP (Polymeric Material from Triglycerides and Polycarbonic anhydrides—obtained from biodegradable epoxydised vegetable oils which can be obtained from renewable sources, using cyclic anhydrides as hardeners and imidazole as catalysts to cure epoxidised oils and forming polymer networks).

The invention claimed is:
1. A method of completing a well, comprising
   pumping a composition prepared by mixing a carrier fluid with sand or a particulate proppant having an average particle size of about 650 μm and resin;
   adding at least one other particulate material having an average particle size of about 60 μm and a substantial fraction of particles in the 6 μm particle range and being present in an amount of about 10% by volume of solids in the composition and
   mixing in a breaker fluid;

wherein the resin and the other particulate material comprise a material that can be modified when placed at a downhole location, said composition being pumped into a region of interest in the well and the resin being allowed to cure so as to consolidate the particulate materials.

2. A method as claimed in claim 1, comprising pumping a spacer fluid and a pad fluid into the region of interest ahead of the composition.

3. A method as claimed in claim 1 further comprising pumping a treatment fluid into the region of interest after the particulate materials have consolidated.

4. A method as claimed in claim 3, wherein the treatment fluid is acid, hydrocarbon, water or steam.

5. A method as claimed in claim 1, further comprising allowing the consolidated materials to react with formation fluids so as to modify the physical properties of the consolidated materials.

6. The method as in claim 1, wherein the particulate materials include fibers.

7. The method as in claim 6, wherein the fibers are soluble.

8. The method as in claim 6, wherein the fibers are selected from the group consisting of glass fibers, novoloid resin fibers, fibers comprised of polyvinyl alcohol, polyglycolic acid, polylactic acid, and mixtures thereof.

9. The method as in claim 1, wherein the proppant is selected from the group consisting of sand, ceramic proppant, bauxite proppant, glass beads, ceramic, microspheres, and mixtures thereof.

10. The method as in claim 1, wherein the proppant comprises 4/6 mesh to 70/140 mesh particles.

11. The method as in claim 1, wherein the other particulate materials is selected from the group consisting of calcium carbonate, hydrocarbon soluble polymers, superabsorbent polymers, polyvinyl alcohol polymer, and mixtures thereof.

12. The method as in claim 1, wherein the carrier fluid comprises a thickened brine.

13. A method for completing a well comprising pumping a composition prepared by mixing a carrier fluid with sand having an average particle size of about 650 μm and resin, adding calcium carbonate having an average particle size of about 60 μm and a substantial fraction of particles in the 6 μm particle range and being present in an amount of about 10% by volume of solids in the composition and mixing in a breaker fluid;

said composition being pumped into a region of interest in the well and the resin being allowed to cure so as to consolidate the particulate materials, wherein the composition further comprises fibers.

* * * * *